(12) United States Patent
Kuhlmann et al.

(10) Patent No.: US 7,347,570 B2
(45) Date of Patent: Mar. 25, 2008

(54) MULTIMEDIA PRESENTATION APPARATUS AND METHOD

(75) Inventors: Charles Edward Kuhlmann, Raleigh, NC (US); Francis Edward Noel, Jr., Durham, NC (US); Charles Joseph Sannipoli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 10/536,039

(22) PCT Filed: Nov. 22, 2002

(86) PCT No.: PCT/US02/37757

§ 371 (c)(1), (2), (4) Date: May 20, 2005

(87) PCT Pub. No.: WO2004/049060

PCT Pub. Date: Jun. 10, 2004

(65) Prior Publication Data

US 2006/0061733 A1    Mar. 23, 2006

(51) Int. Cl.
*G03B 23/00* (2006.01)
*G03B 21/14* (2006.01)
*G03B 21/22* (2006.01)
*G06T 1/00* (2006.01)
*G09G 5/39* (2006.01)
*G06F 13/28* (2006.01)
*G06F 12/00* (2006.01)
*H04N 5/64* (2006.01)

(52) U.S. Cl. .............. 353/119; 353/122; 353/25; 345/522; 345/532; 345/533; 348/744; 711/102; 711/104

(58) Field of Classification Search .............. 353/25, 353/122, 119; 345/522, 530, 531, 532, 533; 348/739, 744; 711/101–105
See application file for complete search history.

(56) References Cited

U.S. PATENT DOCUMENTS

| | | | |
|---|---|---|---|
| 4,994,987 A | 2/1991 | Baldwin | |
| 5,231,388 A * | 7/1993 | Stoltz | 345/84 |
| 5,307,056 A * | 4/1994 | Urbanus | 345/543 |
| 5,327,286 A * | 7/1994 | Sampsell et al. | 359/561 |
| 5,473,573 A | 12/1995 | Rao | |
| 6,433,839 B1 | 8/2002 | Siefken | |
| 6,446,177 B1 | 9/2002 | Tanaka et al. | |

FOREIGN PATENT DOCUMENTS

| | | |
|---|---|---|
| EP | 0977418 | 2/2000 |
| KR | 2000-0011690 | 2/2000 |

* cited by examiner

*Primary Examiner*—Diane I. Lee
*Assistant Examiner*—Magda Cruz
(74) *Attorney, Agent, or Firm*—Yuanmin Cai

(57) ABSTRACT

A multimedia presentation apparatus and method by which a presenter is freed from the requirement of having or providing or transporting a supporting computer system such as the notebook or laptop system by the incorporation of computing capability and an accessible data port into the housing of the apparatus through which an executable data file may be delivered to cause generation of the desired presentation.

15 Claims, 2 Drawing Sheets

MULTIMEDIA PRESENTATION APPARATUS AND METHOD

FIELD AND BACKGROUND OF INVENTION

Heretofore, many presentations were made by the use of transparencies which were projected onto screens or other similar surfaces by optical projectors commonly known as overhead projectors due to the optical arrangement used to create such presentations. More recently, optical projectors relying on micro-mirror semiconductor devices have become ubiquitous. Sales representatives and others similarly engaged now commonly travel with such a projector, also known as a spatial light modulation projector, and a notebook or laptop computer system on which are stored an executable data file representing the presentation and an application program capable of executing the data file and supplying signals to the projector which will control the display of the presentation.

Parallel developments in information technology have included the development of ever more powerful microprocessors capable of executing the application programs necessary to create presentations of the types described, such as Lotus Freelance Graphics and Microsoft PowerPoint. Processors with such capabilities are now at such levels of physical size, computing power and electrical power usage that they can be readily embedded into what have become essentially consumer devices, such as game machines used with television receivers.

Such developments have also included the proliferation of digital cameras and memory module developments intended to facilitate consumer usage of such cameras. Such memory module development has included various implementations of flash memory devices, including the proprietary Sony "Memory Stick", the more open standard compact flash cards, and devices intended for attachment by a Universal Serial Bus (USB) port. The common characteristic of such devices is that they are relatively small, readily manipulable by a user, and coupled to a consumer device by insertion into an appropriate port provided on the device.

BRIEF DESCRIPTION OF INVENTION

With the foregoing in mind, it is a purpose of this invention to bring about a convergence of the developments described above for the benefit of persons engaged in the creation and display of multimedia presentations. In pursuing this purpose, the present invention provides a multimedia presentation apparatus and method by which a presenter is freed from the requirement of having or providing or transporting a supporting computer system such as the notebook or laptop system mentioned above. The present invention accomplishes the intended purpose by a felicitous incorporation of computing capability and an accessible data port into the housing of the apparatus through which an executable data file may be delivered to cause generation of the desired presentation.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
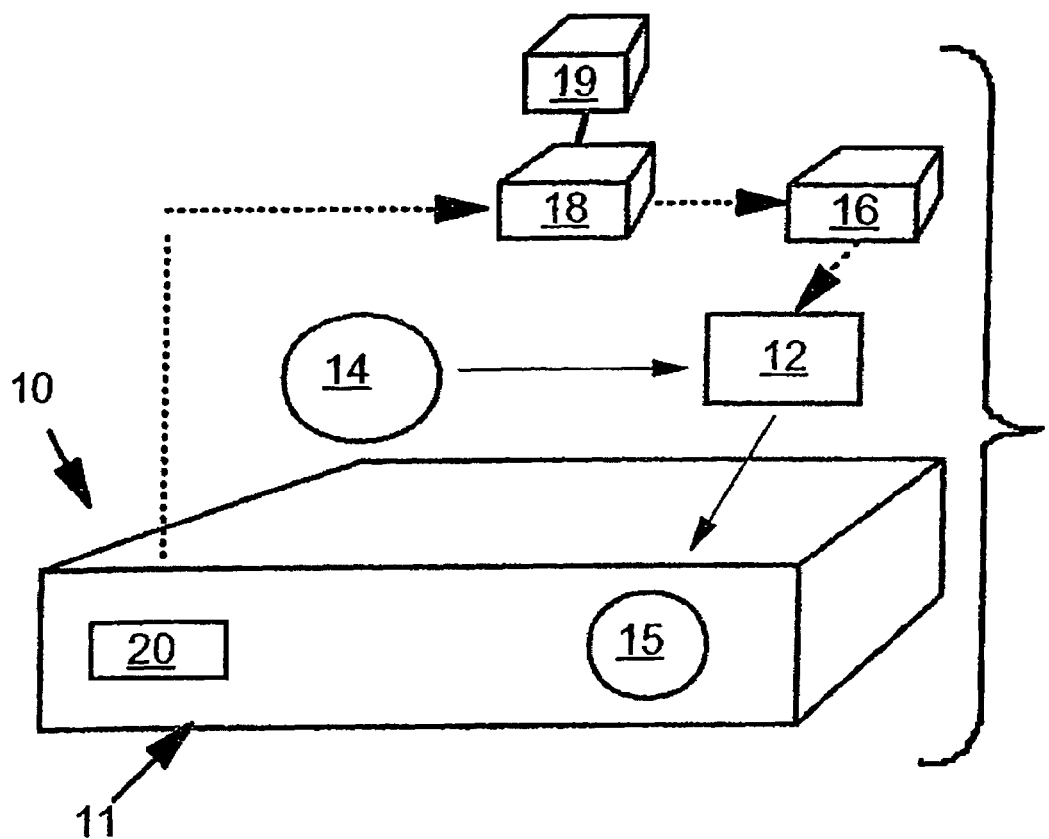
FIG. 1 is an exploded perspective view of an apparatus in accordance with this invention.

Referring now more particularly to FIG. 1, an exploded perspective view is there shown of an apparatus which for present purposes is called a multimedia presentation apparatus 10. Such an apparatus has a housing 11 within which is positioned a micro-mirror semiconductor device 12 of a type known as a spatial light modulator. Such devices are known, available from Texas Instruments, and shown and described in patents held by that business. The apparatus 10 also has a light source 14 from which light is optically coupled to the modulator 12 to impinge light on the modulator. An optical system generally indicated at 15 directs light reflected from the modulator 12 outwardly of the apparatus 10 to cause display of a presentation on an appropriate surface such as a large screen (not shown) Lights paths are indicated by arrows in FIG. 1. Circuitry indicated at 16 controls the movement of the mirror elements of the modulator to control the characteristics of the display generated.

In accordance with this invention, the apparatus 10 also has within the housing 11 a processor 18. The processor is one of the types mentioned hereinabove as capable of executing application programs and data files supplying digital data to the circuitry 16 to cause generation of a presentation display. Suitable processors may be found among the processor products offered by IBM, Intel, and AMD among others. The processor 18 preferably is coupled to internal memory 19 in which digital files may be stored accessibly to the processor. Such digital files may, for example, be presentation application programs of the sort mentioned hereinabove, either in full or reduced "reader" form depending upon the memory storage capability provided and/or the processing capabilities of the processor.

Mounted on the housing 11 and electrically coupled with the processor 18 is a data port 20. The data port 20 is accessible from the exterior of the housing 11 and capable of receiving a manually insertable memory element from which the port 20 passes an executable data file to the processor 18 to enable generation of signals controlling the modulator 12. Signal paths are indicated in FIG. 1 by dashed lines. The port may be a USB port or may alternatively be a port adapted to some other form of device such as a Memory Stick or compact flash card. Where the port is a USB port, additional functionality may be attainable, in that the memory device may be a flash memory device sized for ready manual holding and manipulation, a cable connecting to an optical or magnetic rotating media device such as a CD, DVD or hard drive device, or a cable connecting to a network such as an Ethernet LAN through which a data file may be delivered. Further, such additional capability may include, where appropriate to the presentation application program being executed, attachment of a pointing device such as a mouse to enable on-screen manipulation of a cursor or the like or a device generating overlay signals such as a sketch pad or touch screen enabling a presenter to create, during a presentation, overlay marks, charts or the like.

Figure 2:
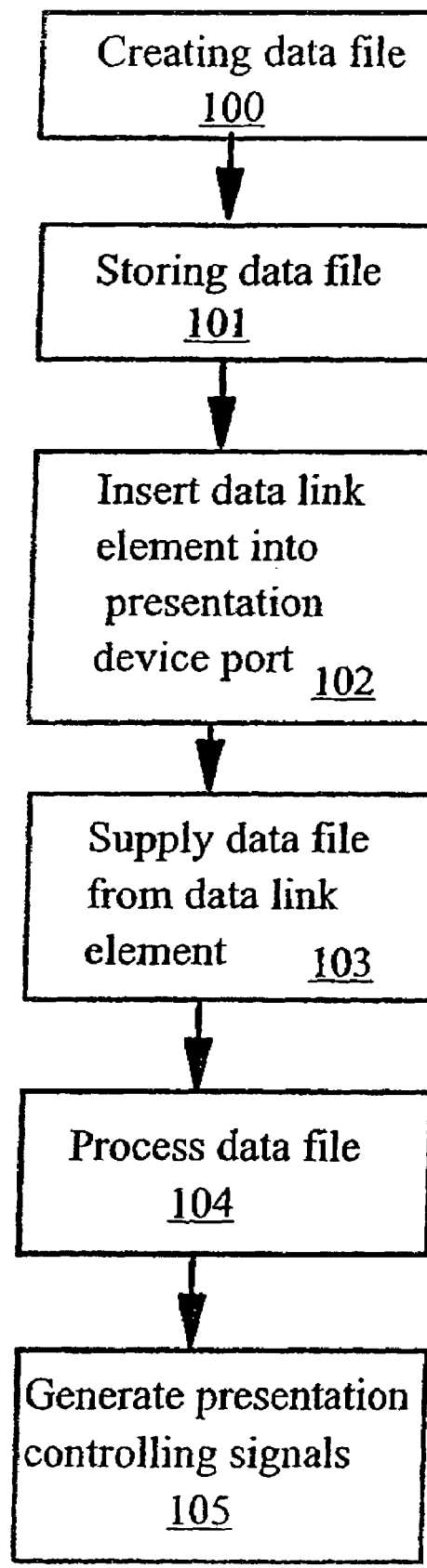
FIG. 2 is a simplified flow chart of the steps involved in practice of the method invention.

Turning now to FIG. 2, a method implemented in the use of this invention is there briefly illustrated. One exemplary method will include the steps of creating a presentation data file indicated at 100, storing the file at 101 in a data link element in the form of a flash memory device, thereafter inserting the memory device at 102 into a data port of a presentation apparatus, supplying the data file from the manually detachable data link element at 103, processing the data file within the apparatus at 104, and generating signals controlling the presentation at 105.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
   a spatial light modulation presentation device having a housing,
   a processor mounted within said housing and electrically coupled to deliver signals controlling the characteristics of a projected presentation, and
   a data port mounted on said housing and electrically coupled to said processor, said data port being accessible from the exterior of said housing and receiving a manually insertable element through which an executable data file is accessible to said processor to enable generation of said signals.

2. An apparatus comprising:
   a spatial light modulation presentation device having a housing, an electrically driven micro-mirror device within the housing, a light source optically coupled to said micro-mirror device to impinge light thereon, an optical system coupled to said micro-mirror device to direct reflected light outwardly of said housing, and circuitry within said housing electrically coupled to said micro-mirror device to drive movement of said micro-mirror device and to control the characteristics of a presentation projected therefrom,
   a processor within said housing electrically coupled to said circuitry to deliver thereto signals controlling the characteristics of the projected presentation, and
   a data port mounted on said housing and electrically coupled to said processor, said data port being accessible from the exterior of said housing and receiving a manually insertable element through which an executable data file is passed to said processor to enable generation of said signals.

3. An apparatus according to one of claims 1 and 2 wherein said data port receives a flash memory element.

4. An apparatus according to one of claims 1 and 2 wherein said data port is an USB port.

5. An apparatus according to one of claims 1 and 2 wherein said data port is a compact flash port.

6. An apparatus according to one of claims 1 and 2 wherein said data port is a Memory Stick port.

7. An apparatus comprising:
   a spatial light modulation presentation device having a housing,
   a processor mounted within said housing and electrically coupled to deliver signals controlling the characteristics of a projected presentation,
   a data port mounted on said housing and electrically coupled to said processor, said data port being accessible from the exterior of said housing and receiving a manually insertable element through which an executable data file is accessible to said processor to enable generation of said signals, and
   a data link element disposed in said port.

8. An apparatus comprising:
   a spatial light modulation presentation device having a housing, an electrically driven micro-mirror device within the housing, a light source optically coupled to said micro-mirror device to impinge light thereon, an optical system coupled to said micro-mirror device to direct reflected light outwardly of said housing, and circuitry within said housing electrically coupled to said micro-mirror device to drive movement of said micro-mirror device and to control the characteristics of a presentation projected therefrom,
   a processor within said housing electrically coupled to said circuitry to deliver thereto signals controlling the characteristics of the projected presentation, and
   a data port mounted on said housing and electrically coupled to said processor, said data port being accessible from the exterior of said housing and receiving a manually insertable element through which an executable data file is passed to said processor to enable generation of said signals, and
   a data link element disposed in said port.

9. An apparatus according to one of claims 7 and 8 wherein said data link element is a flash memory element.

10. An apparatus according to one of claims 7 and 8 wherein said data link element is an USB device.

11. An apparatus according to claim 10 wherein said data link element is an USB flash memory device.

12. An apparatus according to claim 10 wherein said data link element is an USB attachable optical drive.

13. An apparatus according to claim 10 wherein said data link element is an USB attachable network interface.

14. An apparatus according to one of claims 7 and 8 wherein said data port is a compact flash port and said data link element is a compact flash card.

15. An apparatus according to one of claims 7 and 8 wherein said data port is a Memory Stick port and said data link element is a Memory Stick.

* * * * *